United States Patent
Deshmukh et al.

(10) Patent No.: US 9,552,277 B2
(45) Date of Patent: Jan. 24, 2017

(54) SYNCHRONIZED JAVA DEBUGGER

(75) Inventors: Kiran Deshmukh, Bangalore (IN); Nataraju Neeluru, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1405 days.

(21) Appl. No.: 12/556,178

(22) Filed: Sep. 9, 2009

(65) Prior Publication Data
US 2011/0061042 A1 Mar. 10, 2011

(51) Int. Cl.
G06F 9/44 (2006.01)
G06F 9/455 (2006.01)
G06F 11/36 (2006.01)

(52) U.S. Cl.
CPC ......... G06F 11/362 (2013.01); G06F 11/3632 (2013.01); *G06F 8/33* (2013.01); *G06F 9/45533* (2013.01); *G06F 11/3664* (2013.01)

(58) Field of Classification Search
CPC . G06F 11/362; G06F 11/3632; G06F 11/3664; G06F 8/33; G06F 9/45533
USPC ...................... 717/125, 129; 718/1
See application file for complete search history.

(56) References Cited

U.S. PATENT DOCUMENTS

| | | | | |
|---|---|---|---|---|
| 5,675,803 A * | 10/1997 | Preisler et al. | ............... | 717/131 |
| 5,848,274 A * | 12/1998 | Hamby et al. | ................ | 717/153 |
| 5,850,554 A * | 12/1998 | Carver | ............................ | 717/162 |
| 6,324,683 B1 * | 11/2001 | Fuh et al. | ...................... | 717/124 |
| 6,393,437 B1 * | 5/2002 | Zinda et al. | ................... | 717/124 |
| 6,477,540 B1 * | 11/2002 | Singh et al. | ........... | 707/999.103 |
| 7,058,620 B1 * | 6/2006 | Mandel, III | ........... | 707/999.001 |
| 7,155,426 B2 * | 12/2006 | Al-Azzawe | | |
| 7,350,194 B1 * | 3/2008 | Alpern | ......................... | 717/124 |
| 7,500,225 B2 * | 3/2009 | Khan et al. | .................... | 717/124 |

(Continued)

OTHER PUBLICATIONS

White, Greg, and Ron MacKenzie. "CVS Cheatsheet". Mar. 28, 2005. Hosted by the Stanford Linear Accelerator Center. Retrieved by archive.org on Jun. 3, 2008. Retrieved by the Examiner from http://web.archive.org/web/20080603152644/http://www.slac.stanford.edu/grp/cd/soft/cvs/cvs_cheatsheet.html on Dec. 13, 2012.*

(Continued)

*Primary Examiner* — Emerson Puente
*Assistant Examiner* — Erika Kretzmer
(74) *Attorney, Agent, or Firm* — Miles & Stockbridge P.C.

(57) ABSTRACT

A synchronized JAVA debugger maintains synchronization between a JAVA source file in the debugger current working directory and a corresponding JAVA stored procedure in a database to be debugged. The debugger includes fetching module, storage module, display module, and execution module. The fetching module fetches a corresponding JAVA source file for a JAVA stored procedure from a database. The display module displays a recompile option, as a button, menu, or command line interface. In response to selection of the recompile option in the user interface, the execution module terminates the debugging session, sends a modified JAVA source file to the remote target JAVA Virtual Machine (JVM) and instructs the remote JVM to recompile the JAVA stored procedure using the modified JAVA source file before a new debugging session is started. Communication between the debugger and the remote database is by sending and receiving JAVA Debug Wire Protocol (JDWP) command packets.

19 Claims, 6 Drawing Sheets

(56) References Cited

U.S. PATENT DOCUMENTS

| | | | |
|---|---|---|---|
| 7,516,445 B2* | 4/2009 | Maennel et al. | 717/125 |
| 7,730,451 B2* | 6/2010 | Styles et al. | 717/124 |
| 7,840,944 B2* | 11/2010 | Brunswig et al. | 717/124 |
| 8,245,192 B1* | 8/2012 | Chen et al. | 717/122 |
| 2003/0066053 A1* | 4/2003 | Al-Azzawe | 717/127 |
| 2003/0208746 A1* | 11/2003 | Bates et al. | 717/129 |
| 2003/0217354 A1* | 11/2003 | Bates et al. | 717/129 |
| 2004/0194064 A1* | 9/2004 | Ranjan et al. | 717/124 |
| 2005/0144599 A1* | 6/2005 | Styles et al. | 717/124 |
| 2007/0006041 A1* | 1/2007 | Brunswig et al. | 714/38 |
| 2007/0006155 A1* | 1/2007 | Maennel et al. | 717/124 |

OTHER PUBLICATIONS

International Business Machines Corporation. "WebSphere Studio Application Developer Version 5 Programming Guide" Jul. 2003, IBM Corp. pp. 3, 4, 47-54, 61-66, 69-71, 145-150, 271-292, 553-572, and 655-656.*

Mancier, Patrick. "Debugging C++ Using Visual Studio 2005/2008, Part 3: Using Breakpoints Effectively" Indexed on May 11, 2009 by Internet Archive. Retrieved by the Examiner on Sep. 29, 2015 from https://web.archive.org/web/20090511122724/http://cprogramming.com/tutorial/visual_studio_breakpoints.html pp. 1-4.*

Microsoft. "Build and Run, Projects and Solutions, Options Dialog Box" Retrieved from https://msdn.microsoft.com/en-us/library/cyhcc7zc(v=vs.90).aspx on May 5, 2015. pp. 1-2.*

"Java™ Debug Wire Protocol"; Copyright ©2002 Sun Microsystems, Inc.; pp. 1-6; http://java.sun.com/j2se/1.4.2/docs/guide/jpda/jdwp-spec.html.

Willie Hardie et al; "Oracle Database 11 g Product Family"; An Oracle White Paper, Sep. 2009; pp. 1-16; http://www.oracle.com/technology/products/database/oracle11g/pdf/database-11g-product-family-technical-whitepaper.pdf.

* cited by examiner

SYNCHRONIZED JAVA DEBUGGER

FIELD

One embodiment is directed generally to computer systems, and in particular to debugging in computer systems.

BACKGROUND

Generally, JAVA debuggers process JAVA class files (extension .class) while debugging. JAVA class files are created by compiling JAVA source files (extension .JAVA). A debugger may use the JAVA source files to display the execution control. For instance, if a break point is reached while debugging a JAVA class file, the debugger would stop execution and display the break point on the corresponding JAVA source file.

SUMMARY

In an embodiment, a synchronized JAVA debugger includes a fetching module configured to fetch a corresponding JAVA source file for a JAVA stored procedure from a database when the synchronized JAVA debugger is to be run. The synchronized JAVA debugger also includes a storage module configured to store the JAVA source file in a current working directory to be used by the synchronized JAVA debugger when the synchronized JAVA debugger is run and an execution module configured to run the synchronized JAVA debugger. The synchronized JAVA debugger further includes a display module configured to display execution control based on the JAVA source file during debugging. The synchronized JAVA debugger is configured to use the JAVA source file to maintain synchronization between the JAVA source file in the current working directory of the synchronized JAVA debugger and a corresponding JAVA class file stored in the database.

BRIEF DESCRIPTION OF THE DRAWINGS

In order that the embodiments of the invention will be readily understood, a more particular description of the invention briefly described above will be rendered by reference to specific embodiments that are illustrated in the appended drawings. While it should be understood that these drawings illustrate only typical embodiments of the invention and are not therefore to be considered to be limiting of its scope, the invention will be described and explained with additional specificity and detail through the use of the accompanying drawings, in which.

DETAILED DESCRIPTION

Figure 1:
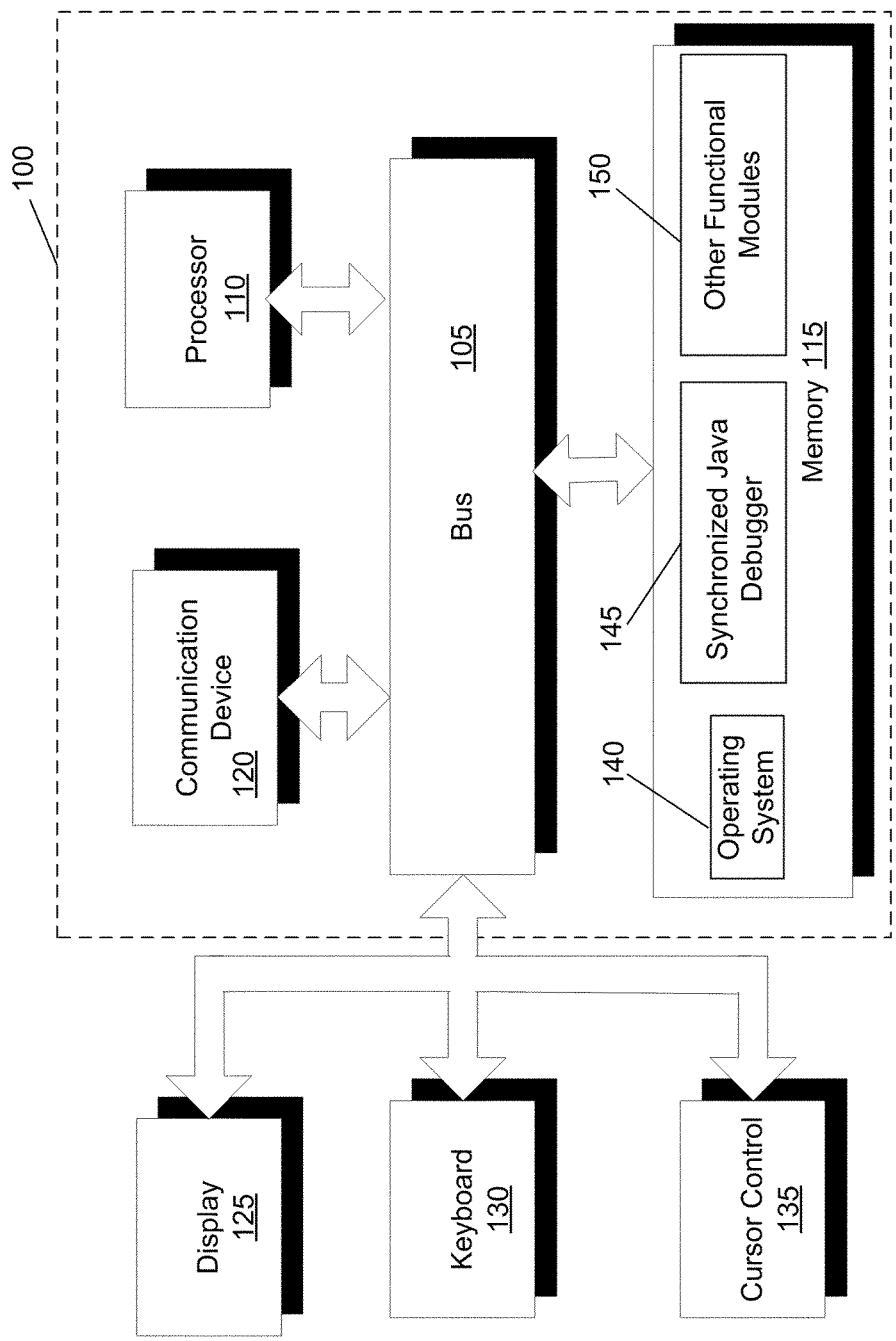
FIG. 1 is a block diagram illustrating a server having a synchronized JAVA debugger that can implement an embodiment of the present invention.

If a user updates the JAVA source file and the debugger is using the old class file, rather than the new class file that would be generated based on the updates, the debugger would not be able to properly display execution control with respect to the updated source file. In other words, actual execution control and the execution control shown by the debugger would differ. This occurs because the JAVA source file and the JAVA class file that is being processed by the debugger are not synchronized with respect to one another.

In some embodiments, when a JAVA Virtual Machine ("JVM") is running inside a database, such as Oracle Database®, both the JAVA source and class files are stored in the database. When a user chooses to perform debugging, the debugger front-end (e.g., the Graphical User Interface ("GUI") application that the user is running, such as some embodiments of the synchronized JAVA debugger) may retrieve a JAVA source file, for instance, by extending the JAVA Debug Wire Protocol ("JDWP") developed by Sun Microsystems® to allow a file transfer or using JAVA Database Connectivity ("JDBC") protocol Application Program Interfaces ("APIs"). JDWP is used for communication between a debugger and the JVM that the debugger debugs (the target JVM). The debugger and the database may be running on the same computer or be running on different computers.

In some embodiments, a synchronized JAVA debugger includes a fetching module configured to fetch a corresponding JAVA source file for a JAVA stored procedure from a database when the synchronized JAVA debugger is to be run by a user. In the case that JDWP is used for file retrieval, JAVA source files may be compressed before sending them to the synchronized JAVA debugger in order to reduce the amount of data that is fetched. JDWP is a protocol used for communication between a debugger and a target JVM that the debugger is debugging, such as the JVM included in the database. The debugger, such as some embodiments of the synchronized JAVA debugger, may be running on a different process on the same computer as the target JVM or on a remote computer. JDWP is packet-based and is stateless, meaning that states are not maintained over multiple command/reply packet pairs.

There are two basic types of packets in JDWP: command packets and reply packets. Either the debugger or the target JVM may send command packets. Command packets may be sent by the target JVM to notify the debugger of some event in the target JVM, such as reaching a breakpoint or throwing an exception. Reply packets are sent in response to command packets and contain information on the success or failure of the command. In some embodiments of the present invention, JDWP may be extended to provide a JAVA source file to the debugger. For instance, when the debugger sends a command to the target JVM indicating that debugging is to be performed, the target JVM may send the JAVA source file corresponding with the class file that is to be debugged to the debugger in a reply packet. In the case of large files, the JAVA source file may be compressed and/or more than one packet may be used to send the JAVA source file.

In some embodiments, the synchronized JAVA debugger also includes a storage module configured to store the JAVA source file in a current working directory to be used by the synchronized JAVA debugger when the synchronized JAVA debugger is run. The current working directory is a temporary location that the debugger uses to find files to process. In some embodiments, the synchronized JAVA debugger further includes an execution module configured to run the synchronized JAVA debugger and a display module configured to display execution control based on the JAVA source file during debugging. In such embodiments, the synchronized JAVA debugger is configured to use the JAVA source file to maintain synchronization between the JAVA source file in the current working directory of the synchronized JAVA debugger and a corresponding JAVA class file stored in the database. In this manner, when debugging operations start, both the JAVA source file in the database and the JAVA source file in the current working directory are identical copies of one another and thus, debugging operations between the synchronized JAVA debugger and the database are synchronized.

FIG. 1 is a block diagram of a computer 100 that can implement an embodiment of the present invention. Computer 100 includes a bus 105 or other communication mechanism for communicating information, and a processor 110 coupled to bus 105 for processing information. Processor 110 may be any type of general or specific purpose processor, including a central processing unit ("CPU") or application specific integrated circuit ("ASIC"). Computer 100 further includes a memory 115 for storing information and instructions to be executed by processor 110. Memory 115 can be comprised of any combination of random access memory ("RAM"), read only memory ("ROM"), flash memory, cache, static storage such as a magnetic or optical disk, or any other types of computer readable media or combination thereof. Additionally, computer 100 includes a communication device 120, such as a network interface card, to provide access to a network. Therefore, a user may interface with computer 100 directly, or remotely through a network or any other method.

Computer readable media may be any available media that can be accessed by processor 110 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 110 is further coupled via bus 105 to a display 125, such as a Liquid Crystal Display ("LCD"), for displaying information to a user, such as server status information. A keyboard 130 and a cursor control device 135, such as a computer mouse, is further coupled to bus 105 to enable a user to interface with computer 100.

In one embodiment, memory 115 stores software modules that provide functionality when executed by processor 110. The modules include an operating system 140 that provides operating system functionality for computer 100. The modules further include a synchronized JAVA debugger 145 that is configured to facilitate synchronized JAVA debugging. Computer 100 can be part of a larger system such as a cluster computing system, a distributed computing system, a cloud computing system, a "server farm" or any other system having multiple servers and/or computing devices. Computer 100 will typically include one or more additional functional modules 150 to include additional functionality. In some embodiments, synchronized JAVA debugger 145 may be part of operating system 140 or part of one or more other functional modules included in other functional modules 150, such as a JVM.

It should be noted that many of the functional features described in this specification have been presented as modules in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be at least partially implemented in software for execution by various types of processors. An identified unit of executable code in a software module may, for instance, comprise one or more physical or logical blocks of computer instructions which may, for instance, be organized as an object, procedure or function. Nevertheless, the executables of an identified module need not be physically located together, but may comprise disparate instructions stored in different locations that, when joined logically together, comprise the module and achieve the stated purpose for the module. Modules may be stored on a computer-readable medium, which may be, for instance, a hard disk drive, a flash device, random access memory ("RAM"), a tape drive, an optical drive, a compact disk having read-only memory ("CD-ROM") or a digital video disk having read-only memory ("DVD-ROM"), or any other such medium used to store data. The medium may be read-only or read/write.

Indeed, a unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
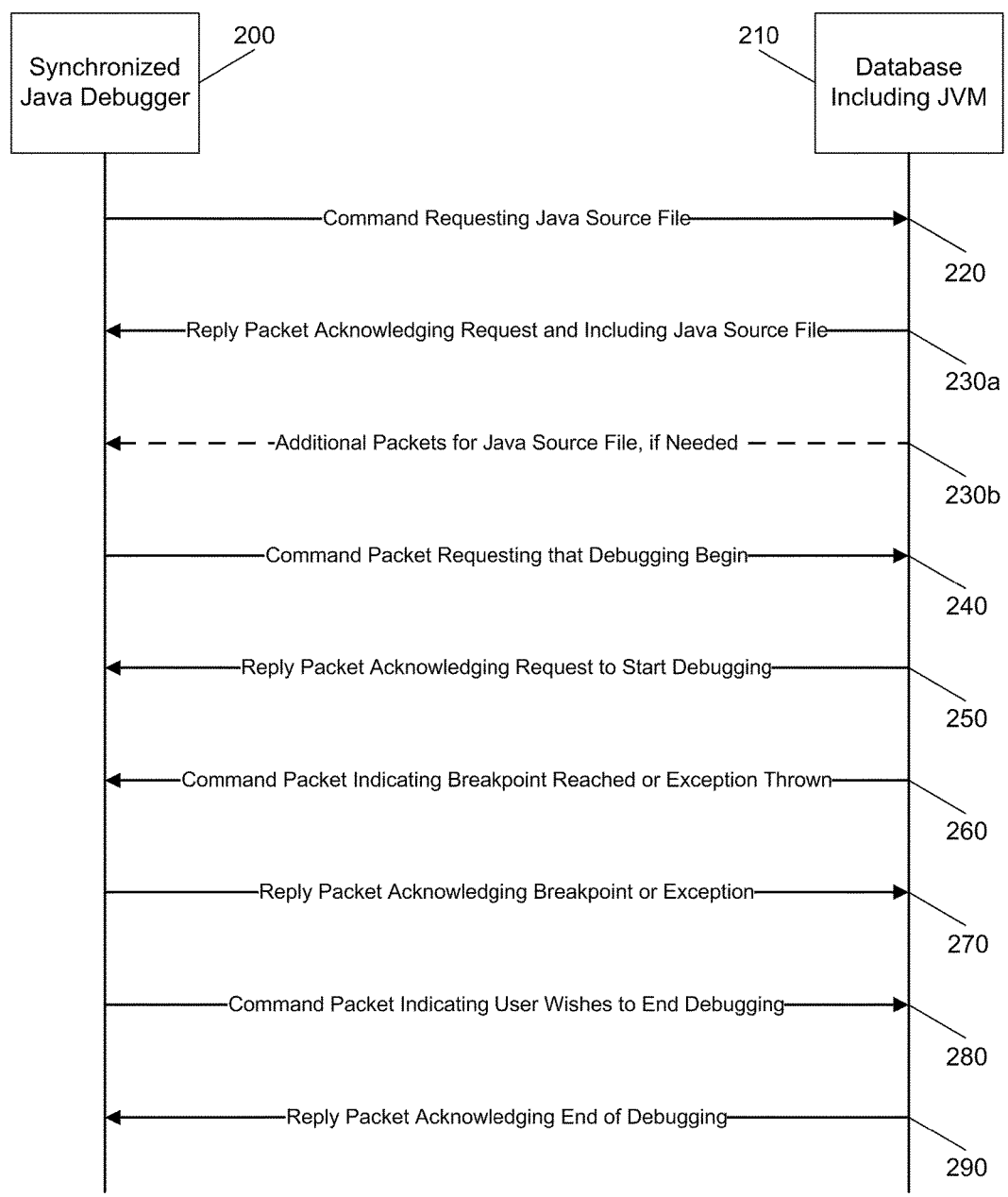
FIG. 2 is a timing diagram of debugging operations and retrieval of a JAVA source file according to an embodiment of the present invention.

FIG. 2 is a timing diagram of debugging operations and retrieval of a JAVA source file according to an embodiment of the present invention. In this embodiment, the timing diagram illustrates JDWP command and reply packets sent between a synchronized JAVA debugger 200 and a database 210 that includes a JVM. In some embodiments, synchronized JAVA debugger 200 may be synchronized JAVA debugger 145 of FIG. 1. In this embodiment, when a user of synchronized JAVA debugger 200 decides to debug a JAVA stored procedure in database 210, synchronized JAVA debugger 200 sends a JDWP command packet requesting a JAVA source file for the class to be debugged at 220. This command may be sent when synchronized JAVA debugger 200 is started, when a file is opened, when the user initiates debugging, or any other suitable time at the implementer's discretion. In response to this request, the JVM of database 210 sends a JDWP reply packet at 230a acknowledging the request and including the requested JAVA source file. If a single packet is insufficient to store the entire JAVA source file, additional packets containing the remainder of the JAVA source file may be sent at 230b. As noted above, the JAVA source file may be compressed in some embodiments to reduce the amount of data to be transmitted.

Once the user selects a command in synchronized JAVA debugger 200 that starts debugging, a command packet requesting that debugging begin in the JVM of database 210 is sent at 240. In the event that the JAVA source file is requested automatically when a user starts debugging, the JAVA source file may be provided in response to the command packet requesting that debugging begin at 240 and a command requesting the JAVA source file at 220 may be omitted. In response to the command packet at 240, the JVM of database 210 sends a reply packet acknowledging the request to start debugging at 250.

When a breakpoint is reached or an exception is thrown in the JVM of database 210, a command packet indicating that the breakpoint was reached or the exception was thrown (e.g., the JVM catches an exception while running and provides, for example, the execution stack trace to the debugger) is sent to synchronized JAVA debugger 200 at 260. In response to receiving the command packet, synchronized JAVA debugger 200 sends a reply packet to the JVM of database 210 acknowledging the breakpoint or exception at 270. At some time later, the user of synchronized JAVA debugger 200 terminates debugging and a command packet indicating the end of debugging is sent to the JVM of database 210 at 280. The JVM of database 210 then sends a reply packet acknowledging the end of debugging to synchronized JAVA debugger 200 at 290. In some embodiments, the sending of the acknowledgement message at 290 may be omitted. While the flow diagram of FIG. 2 is provided by way of example to show how communication may flow between synchronized JAVA debugger 200 and database 210, it is understood that other messages and configurations may be used consistent with the JDWP specification.

Figure 3:
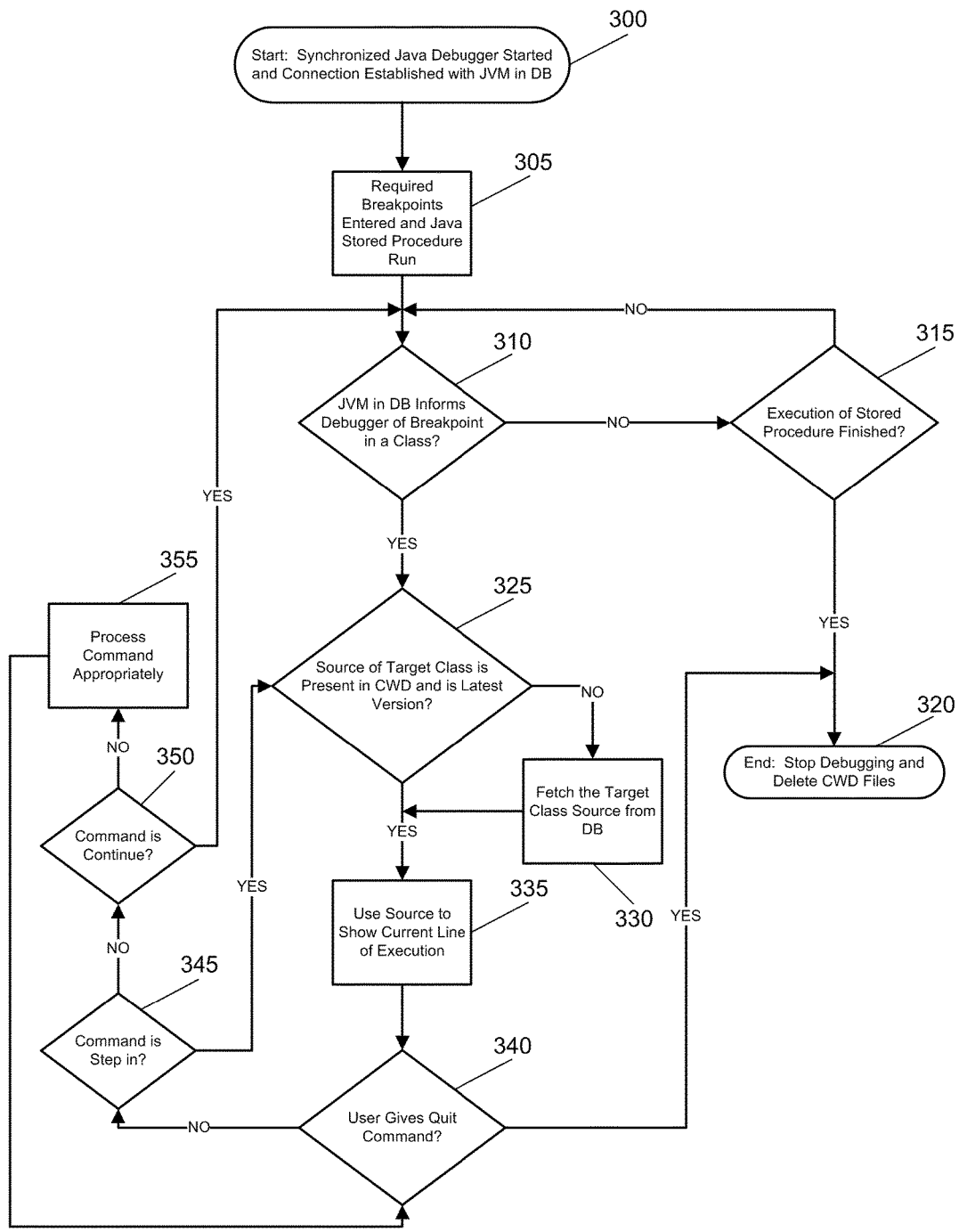
FIG. 3 is a flow diagram illustrating a process flow for performing synchronized JAVA debugging according to an embodiment of the present invention.

FIG. 3 is a flow diagram illustrating a process flow for performing synchronized JAVA debugging according to an embodiment of the present invention. In some embodiments, the functionality of FIG. 3, and FIG. 4 below, is implemented by software stored in memory or other computer readable media, and executed by a processor. In other embodiments, the functionality may be performed by hardware (e.g., through the use of an ASIC, a programmable gate array ("PGA"), a field programmable gate array ("FPGA"), etc.), or any combination of hardware and software.

In some embodiments, the process of FIG. 3 may be performed, for example, by computer 100 of FIG. 1 via synchronized JAVA debugger 145. In FIG. 3, the process flow begins with synchronized JAVA debugger 145 being started and a connection being established with a JVM of a database at 300. Required breakpoints set by a user are entered and a JAVA stored procedure is run at 305. Synchronized JAVA debugger 145 then checks whether the JVM of the DB has informed the debugger of a breakpoint in a class at 310. This could be performed iteratively or else be associated with, and triggered by, an event. If a breakpoint is not detected at 310 and execution of the stored procedure has not finished at 315, the process proceeds back to 310. If execution of the stored procedure has finished at 315, debugging is stopped and files in the current working directory are deleted at 320.

If a breakpoint in a class is discovered during execution at 310, synchronized JAVA debugger 145 checks whether the source of the target class having the breakpoint is present in the current working directory and is the latest version at 325. If not, synchronized JAVA debugger 145 fetches the JAVA source file for the target class from the database at 330. In some embodiments, JAVA source files for target classes are fetched lazily, meaning that the JAVA source file is only fetched upon encountering the class during debugging. Synchronized JAVA debugger 145 then uses the JAVA source file for the target class to show the current line of execution at 335.

Synchronized JAVA debugger 145 then checks whether a user gives a quit command at 340. If the command is a quit command at 340, debugging is stopped and files in the current working directory are deleted at 320. If the command is not a quit command, synchronized JAVA debugger 145 checks whether the command is a step in command at 345. If so, synchronized JAVA debugger steps into the current statement to be executed and the proceeds through the previously described flow at 325. If the command is not a step in command at 345, synchronized JAVA debugger 145 checks whether the command is continue at 350. If so, the process continues to 310 and executes until encountering a breakpoint, as discussed above. If the command is not continue at 350, synchronized JAVA debugger 145 processes the command appropriately at 355 and then proceeds through the previously described flow at 340. While FIG. 3 shows various commands being checked in a certain order, it is readily appreciated by one of ordinary skill in the art that other debugging commands and/or another order of checking the current command may be implemented at the implementer's discretion. Further, in some embodiments, synchronized JAVA debugger 145 may also check for errors thrown by the JVM and display the stack trace of the errors on the screen for a user to peruse.

Figure 4:
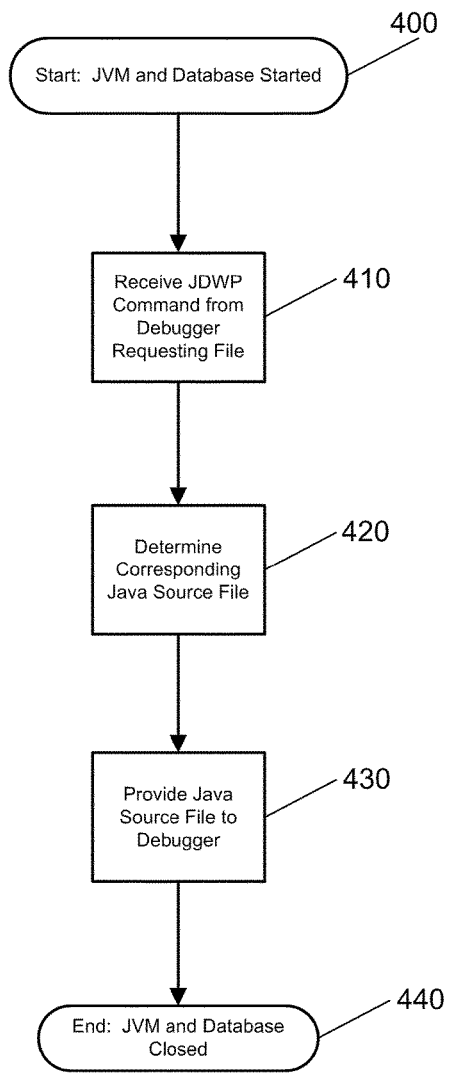
FIG. 4 is a flow diagram illustrating a process flow for providing appropriate JAVA source files from a JAVA Virtual Machine ("JVM") and database to a synchronized JAVA debugger according to an embodiment of the present invention.

FIG. 4 is a flow diagram illustrating a process flow for providing appropriate JAVA source files from a JVM and database to a synchronized JAVA debugger according to an embodiment of the present invention. In FIG. 4, the process begins with the JVM and database being started at 400. The JVM then receives a JDWP command packet from a synchronized JAVA debugger requesting a JAVA source file for a JAVA stored procedure that is stored in the database at 410. The JVM determines the JAVA source file that corresponds with the JAVA stored procedure at 420. Responsive to the JDWP message, the JVM or the database then provides the JAVA source file to the synchronized JAVA debugger at 430. The synchronized JAVA debugger stores the JAVA source file in a current working directory and uses the JAVA source file to maintain synchronization between the JAVA source file used by the synchronized JAVA debugger and a corresponding JAVA class file stored in the database. The process then ends with the JVM and database being closed at 440. In some embodiments, in lieu of using an extension of JDWP for synchronizing JAVA files, the synchronization may be performed via a JDBC API.

Figure 5:
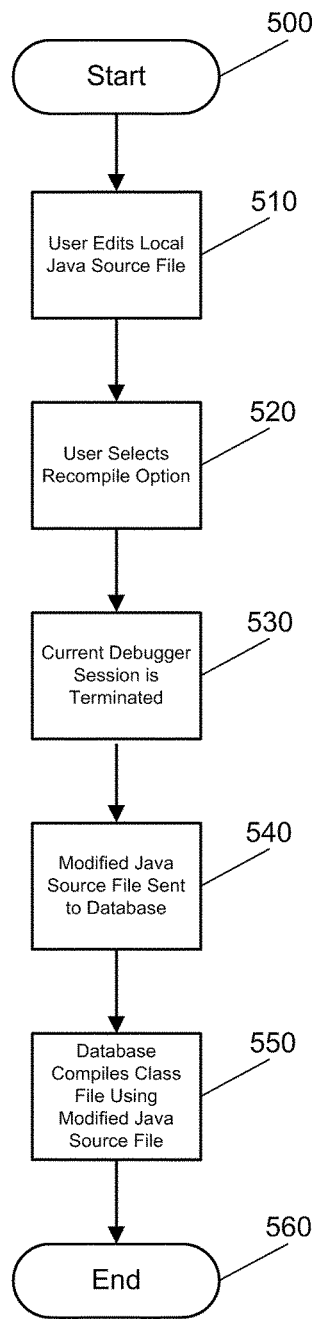
FIG. 5 is a flow diagram illustrating a process flow for recompiling a class file when a user changes the corresponding JAVA source file according to an embodiment of the present invention.

In some embodiments, it may be preferable to provide a user with an option to modify a JAVA source file in response to, for instance, receiving an error during debugging, and to allow the user to force the JVM of the database to recompile the class file to correspond with the updated JAVA source file. FIG. 5 is a flow diagram illustrating a process flow for recompiling a class file when a user changes the corresponding JAVA source file according to an embodiment of the present invention. The process begins at 500 and proceeds to a user modifying a JAVA source file stored in the current working directory of synchronized JAVA debugger 145 at 510. The user then selects a recompile option of synchronized JAVA debugger 145, which may be a button, drop-down menu option, a text command or the like, at 520. In response to the user selecting the recompile option, synchronized JAVA debugger 145 terminates the current debugging session at 530.

Once the current debugging session is terminated at 530, synchronized JAVA debugger 145 sends the modified JAVA source file to the database, along with a command requesting that the JVM of the database recompile the class file based on the modified JAVA source file at 540. The JVM of the database then recompiles the class file at 550 and when the user starts a debugging session again, the class file used by the JVM of the database will reflect the modifications to the JAVA source file made by the user. The process then ends at 560.

Figure 6:
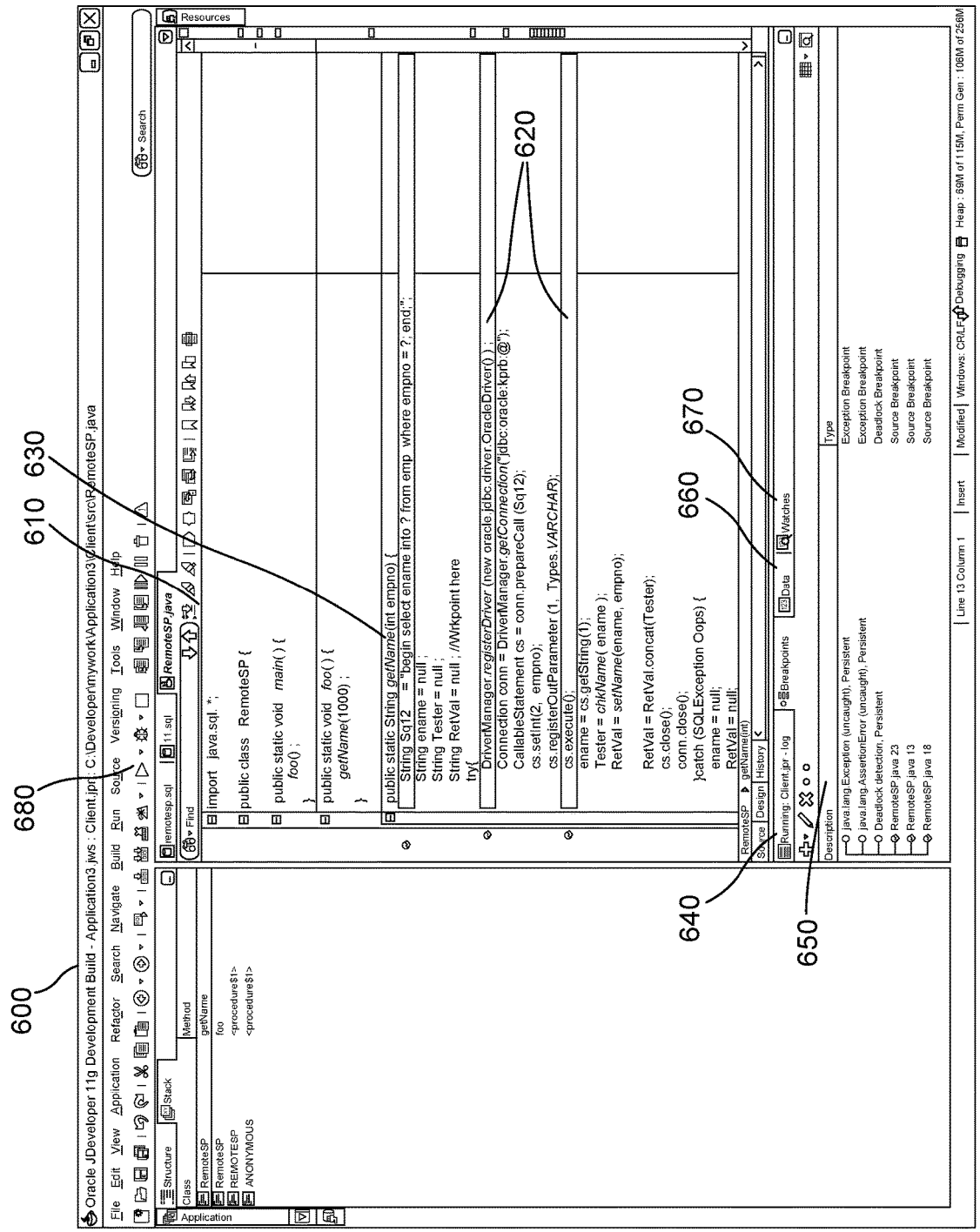
FIG. 6 is a screenshot view of a synchronized JAVA debugger according to an embodiment of the present invention.

FIG. 6 is a screenshot view 600 of a synchronized JAVA debugger according to an embodiment of the present invention. The synchronized JAVA debugger has an editing window 610 that displays the JAVA source file that is being debugged. Breakpoints 620 may be set or unset by a user by clicking a mouse, for instance, and selected breakpoints are highlighted as shown. The current statement being executed 630 is also highlighted and may be highlighted in a different color from breakpoints so a user can easily distinguish between these. An execution stack pane 640 (currently hidden) of the synchronized JAVA debugger shows the execution stack (i.e., the current path that the execution has followed to reach the current state). A breakpoint pane 650 shows the breakpoints that the user has set in this file. A data pane 660 and a watches pane 670 (both currently hidden) allow the user to examine runtime data from the JAVA source file. A toolbar 680 at the top of the synchronized JAVA debugger screen has various buttons for performing operations such as starting debugging, stopping debugging, step-through, step-over, step-out and continue operations.

In some embodiments, when a user chooses to perform debugging, a synchronized JAVA debugger may retrieve a JAVA source file, for instance, by extending JDWP to allow a file transfer or using JDBC protocol APIs. The synchronized JAVA debugger may then store the JAVA source file in a current working directory, run the debugger, and display execution control based on the stored JAVA source file during debugging. This enables the synchronized JAVA debugger to maintain synchronization between the JAVA source file used for execution control and the corresponding JAVA class file stored in a database.

While the term "computer" has been used in the description of some embodiments of the present invention, the invention may be applied to many types of network computing devices. For purposes of this invention, the term "computer" includes rack computing systems, cloud computing systems, distributed computing systems, personal computers, laptops, cell phones, personal digital assistants, tablet computing devices, mainframes, any networked devices that perform computing operations, and the like.

One having ordinary skill in the art will readily understand that the invention as discussed above may be practiced in a different order, and/or with hardware elements in configurations that are different than those that are disclosed. Therefore, although the invention has been described based upon these preferred embodiments, it would be apparent to, and readily appreciated by, those of ordinary skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. A non-transitory computer-readable medium having instructions stored thereon that, when executed by a processor, cause the processor to synchronize JAVA debugging, the synchronizing including:
    displaying, to a user, an editing window for JAVA source files, one of a plurality of hideable panes including an execution stack pane, a breakpoint pane or a data pane, and a button, dropdown menu or command line interface for selecting a recompile option;
    fetching a JAVA source file corresponding to a JAVA class file including a JAVA stored procedure from a database, including:
        sending, to a target JAVA virtual machine (JVM) of the database, a JAVA Debug Wire Protocol (JDWP) command packet requesting the JAVA source file, and receiving, from the target JVM, a JDWP reply packet acknowledging the request for the JAVA source file and including the JAVA source file;
    storing the JAVA source file in a current working directory;
    lazily fetching additional JAVA source files for classes that are referenced in the JAVA source file;
    debugging the JAVA stored procedure using the JAVA source file stored in the current working directory in cooperation with the target JVM that executes the JAVA class associated with the JAVA source file, including:
        sending, to the target JVM, a JDWP command packet requesting to start a debugging session in the target JVM,
        receiving, from the target JVM, a JDWP reply packet acknowledging the request to start the debugging session,
        receiving, from the target JVM, a JDWP command packet indicating when a breakpoint is reached or an exception is thrown,
        sending, to the target JVM, a JDWP reply packet acknowledging the breakpoint or exception,
        in response to receiving a selection of the recompile option from the user: terminating the debugging session by sending, to the target JVM, a JDWP command packet indicating an end of the debugging session, and receiving, from the target JVM, a JDWP reply packet acknowledging the end of the debugging session, and
        in response to the terminating the debugging session, sending a modified JAVA source file and a recompile command to the target JVM, the modified JAVA source file including one or more modifications to the JAVA source file stored in the current working directory, and the recompile command instructing the target JVM to recompile the JAVA class using the modified JAVA source file so that the JAVA class reflects the modifications to the JAVA source file before a new debugging session is started; and deleting the JAVA source file in the current working directory when the debugging is completed.

2. The non-transitory computer-readable medium of claim 1, wherein fetching the corresponding JAVA source file includes using an extension of a JAVA Debug Wire Protocol that allows electronic transfer of files.

3. The non-transitory computer-readable medium of claim 1, wherein the editing window is configured to display the JAVA source file, the execution stack pane is configured to display a current path that execution has followed, the breakpoint pane is configured to display breakpoints that the user has set, and the data pane is configured to display runtime data from the JAVA source file.

4. The non-transitory computer-readable medium of claim 1, wherein the synchronizing further comprises prompting the user to verify that the JAVA source file should be fetched from the database prior to performing the fetch of the JAVA source file.

5. The non-transitory computer-readable medium of claim 1, wherein the processor is located on a different computer than the database and the JVM.

6. The non-transitory computer-readable medium of claim 1, wherein the debugging includes receiving breakpoint and exception data from the JVM.

7. A synchronized JAVA debugger, comprising:
a processor and a non-transitory memory, the non-transitory memory storing modules that provide functionality when executed by the processor;
a fetching module configured to fetch a JAVA source file corresponding to a JAVA class file including a JAVA stored procedure from a database, wherein the fetching module is configured to: send, to the target JAVA virtual machine (JVM), a JAVA Debug Wire Protocol (JDWP) command packet requesting the JAVA source file, receive, from the target JVM, a JDWP reply packet acknowledging the request for the JAVA source file and including the JAVA source file, and lazily fetch additional JAVA source files for classes that are referenced in the JAVA source file to be debugged;
a storage module configured to store the JAVA source file in a current working directory;
an execution module configured to debug the JAVA stored procedure using the JAVA source file stored in the current working directory in cooperation with a target JVM of the database that executes the JAVA class associated with the JAVA source file;
a modification receiving module configured to receive modifications to the JAVA source file from a user; and
a display module configured to display, to the user, a button, dropdown menu or command line interface for selecting a recompile option, and an editing window concurrently with one pane of a plurality of hideable panes comprising an execution stack pane, a breakpoint pane or a data pane,
and
wherein the execution module is configured to:
send, to the target JVM, a JDWP command packet requesting to start a debugging session in the target JVM,
receive, from the target JVM, a JDWP reply packet acknowledging the request to start the debugging session,
receive, from the target JVM, a JDWP command packet indicating when a breakpoint is reached or an exception is thrown,
send, to the target JVM, a JDWP reply packet acknowledging the breakpoint or exception,
in response to receiving a selection of the recompile option from the user: terminate the debugging session by sending, to the target JVM, a JDWP command packet indicating an end of the debugging session, and receiving, from the target JVM, a JDWP reply packet acknowledging the end of the debugging session,
in response to the terminating the debugging session, send a modified JAVA source file and a recompile command to the target JVM, the modified JAVA source file including one or more modifications to the JAVA source file stored in the current working directory, and the recompile command instructing the target JVM to recompile the JAVA class using the modified JAVA source file so that the JAVA class reflects the modifications to the JAVA source file before a new debugging session is started, and
delete the JAVA source file in the current working directory when the debugging is completed.

8. The synchronized JAVA debugger of claim 7, wherein the fetching module is further configured to fetch the corresponding JAVA source file using an extension of a JAVA Debug Wire Protocol that allows electronic transfer of files.

9. The synchronized JAVA debugger of claim 7, wherein the editing window is configured to display the JAVA source file, the execution stack pane is configured to display a current path that execution has followed, the breakpoint pane is configured to display breakpoints that the user has set, and the data pane is configured to display runtime data from the JAVA source file.

10. The synchronized JAVA debugger of claim 7, wherein the display module is further configured to prompt the user to verify that the JAVA source file should be fetched from the database prior to performing the fetch of the JAVA source file.

11. A computer-implemented method for synchronized JAVA debugging, comprising:
displaying, to a user, an editing window for JAVA source files, one of a plurality of hideable panes including an execution stack pane, a breakpoint pane or a data pane, and a button, dropdown menu or command line interface for selecting a recompile option;
fetching a JAVA source file corresponding to a JAVA class file including a JAVA stored procedure from a database, including: sending, to a target JAVA virtual machine (JVM) of the database, a JAVA Debug Wire Protocol (JDWP) command packet requesting the JAVA source file, and receiving, from the target JVM, a JDWP reply packet acknowledging the request for the JAVA source file and including the JAVA source file;
storing the JAVA source file in a current working directory;
lazily fetching additional JAVA source files for classes that are referenced in the JAVA source file;
debugging the JAVA stored procedure using the JAVA source file stored in the current working directory in cooperation with the target JVM that executes the JAVA class associated with the JAVA source file, including:
sending, to the target JVM, a JDWP command packet requesting to start a debugging session in the target JVM,
receiving, from the target JVM, a JDWP reply packet acknowledging the request to start the debugging session, receiving, from the target JVM, a JDWP command packet indicating when a breakpoint is reached or an exception is thrown, sending, to the target JVM, a JDWP reply packet acknowledging the breakpoint or exception, in response to receiving a selection of the recompile option from the user: terminating the debugging session by sending, to the target JVM, a JDWP command packet indicating an end of the debugging session, and receiving, from the target JVM, a JDWP reply packet acknowledging the end of the debugging session, and in response to the terminating the debugging session, sending a modified JAVA source file and a recompile command to the target JVM, the modified JAVA source file including one or more modifications to the JAVA source file stored in the current working directory, and the recompile command instructing the target JVM to recompile the JAVA class using the modified JAVA source file so that the JAVA class reflects the modifications to the JAVA source file before a new debugging session is started; and deleting the JAVA source file in the current working directory when the debugging is completed.

12. The computer-implemented method of claim 11, wherein the editing window is configured to display the JAVA source file, the execution stack pane is configured to display a current path that execution has followed, the breakpoint pane is configured to display breakpoints that the user has set, and the data pane is configured to display runtime data from the JAVA source file.

13. The computer-implemented method of claim 11, further comprising: prompting the user to verify that the JAVA source file should be fetched from the database prior to performing the fetch of the JAVA source file.

14. The method of claim 11, wherein the debugging includes receiving breakpoint and exception data from the JVM.

15. A non-transitory computer readable medium having instructions stored thereon that, when executed by a processor, cause the processor to synchronize JAVA debugging of a JAVA stored procedure in a database, the synchronizing including:

displaying, to a user, a button, dropdown menu or command line interface for selecting a recompile option;

sending, to a target JAVA virtual machine (JVM) of the database, a JAVA Debug Wire Protocol (JDWP) command packet requesting a JAVA source file corresponding to a JAVA class file including the JAVA stored procedure;

receiving, from the target JVM, a JDWP reply packet acknowledging the request for the JAVA source file and including the JAVA source file;

lazily fetching additional JAVA source files for classes that are referenced in the JAVA source file;

sending, to the target JVM, a JDWP command packet requesting to start a debugging session in the target JVM;

receiving, from the target JVM, a JDWP reply packet acknowledging the request to start the debugging session;

debugging the JAVA stored procedure using the JAVA source file, stored in a current working directory, in cooperation with the target JVM that executes the JAVA class associated with the JAVA source file;

receiving, from the target JVM, a JDWP command packet indicating when a breakpoint is reached or an exception is thrown;

sending, to the target JVM, a JDWP reply packet acknowledging the breakpoint or exception;

in response to receiving a selection of the recompile option from the user: terminating the debugging session by sending, to the target JVM, a JDWP command packet indicating an end of the debugging session, and receiving, from the target JVM, a JDWP reply packet acknowledging the end of the debugging session;

in response to the terminating the debugging session, sending a modified JAVA source file and a recompile command to the target JVM, the modified JAVA source file including one or more modifications to the JAVA source file stored in the current working directory, and the recompile command instructing the target JVM to recompile the JAVA class using the modified JAVA source file so that the JAVA class reflects the modifications to the JAVA source file before a new debugging session is started; and deleting the JAVA source file in the current working directory when the debugging is completed.

16. The non-transitory computer-readable medium of claim 15, wherein the synchronizing further comprises providing the corresponding JAVA source file to the synchronized JAVA debugger using an extension of a JAVA Debug Wire Protocol that allows electronic transfer of files.

17. A computer-implemented method for synchronizing JAVA debugging of a JAVA stored procedure in a database, comprising:

displaying, to a user, a button, dropdown menu or command line interface for selecting a recompile option;

sending, to a target JAVA virtual machine (JVM) of the database, a JAVA Debug Wire Protocol (JDWP) command packet requesting a JAVA source file corresponding to a JAVA class file including the JAVA stored procedure;

receiving, from the target JVM, a JDWP reply packet acknowledging the request for the JAVA source file and including the JAVA source file;

sending, to the target JVM, a JDWP command packet requesting to start a debugging session in the target JVM;

receiving, from the target JVM, a JDWP reply packet acknowledging the request to start the debugging session;

lazily fetching additional JAVA source files for classes that are referenced in the JAVA source file;

debugging the JAVA stored procedure using the JAVA source file, stored in a current working directory, in cooperation with the target JVM that executes the JAVA class associated with the JAVA source file;

receiving, from the target JVM, a JDWP command packet indicating when a breakpoint is reached or an exception is thrown;

sending, to the target JVM, a JDWP reply packet acknowledging the breakpoint or exception;

in response to receiving a selection of the recompile option from the user: terminating the debugging session by sending, to the target JVM, a JDWP command packet indicating an end of the debugging session, and receiving, from the target JVM, a JDWP reply packet acknowledging the end of the debugging session;

in response to the terminating the debugging session, sending a modified JAVA source file and a recompile command to the target JVM, the modified JAVA source file including one or more modifications to the JAVA source file stored in the current working directory, and the recompile command instructing the target JVM to recompile the JAVA class using the modified JAVA source file so that the JAVA class reflects the modifications to the JAVA source file before a new debugging session is started; and deleting the JAVA source file in the current working directory when the debugging is completed.

18. The computer-implemented method of claim 17, further comprising: providing the corresponding JAVA source file to the synchronized JAVA debugger using an extension of a JAVA Debug Wire Protocol that allows electronic transfer of files.

19. A synchronized JAVA debugging system, comprising:
a processor and a non-transitory memory, the non-transitory memory storing modules that provide functionality when executed by the processor;
a fetching module configured to fetch a JAVA source file corresponding to a JAVA class file including a JAVA stored procedure from a database, wherein the fetching module is configured to: send, to the target JAVA virtual machine (JVM), a JAVA Debug Wire Protocol (JDWP) command packet requesting the JAVA source file, receive, from the target JVM, a JDWP reply packet acknowledging the request for the JAVA source file and including the JAVA source file, and lazily fetch additional JAVA source files for classes that are referenced in the JAVA source file to be debugged;
a storage module configured to store the JAVA source file in a current working directory;
an execution module configured to debug the JAVA source file using the JAVA source file stored in the current working directory in cooperation with a target JVM of the database that executes the JAVA class associated with the JAVA source file;
a display module configured to display, to a user, a button, dropdown menu or command line interface for selecting a recompile option, and an editing window concurrently with one pane of a plurality of hideable panes comprising an execution stack pane, a breakpoint pane or a data pane;

a modification receiving module configured to receive modifications to the JAVA source file from the user, and wherein the database comprises: a receiving module, a determining module configured to determine the JAVA source file corresponding with the JAVA stored procedure, and a source file providing module configured to provide the JAVA source file to the synchronized JAVA debugger, and wherein the execution module is configured to:
send, to the target JVM, a JDWP command packet requesting to start a debugging session in the target JVM, receive, from the target JVM, a JDWP reply packet acknowledging the request to start the debugging session,
receive, from the target JVM, a JDWP command packet indicating when a breakpoint is reached or an exception is thrown,
send, to the target JVM, a JDWP reply packet acknowledging the breakpoint or exception,
in response to receiving a selection of the recompile option from the user: terminate the debugging session by sending, to the target JVM, a JDWP command packet indicating an end of the debugging session, and receiving, from the target JVM, a JDWP reply packet acknowledging the end of the debugging session,
in response to the terminating the debugging session, send a modified JAVA source file and a recompile command to the target JVM, the modified JAVA source file including one or more modifications to the JAVA source file stored in the current working directory, and the recompile command instructing the target JVM to recompile the JAVA class using the modified JAVA source file so that the JAVA class reflects the modifications to the JAVA source file before a new debugging session is started, and
delete the JAVA source file in the current working directory when the debugging is completed.

* * * * *